United States Patent [19]

Coombs et al.

[11] Patent Number: 4,482,453
[45] Date of Patent: Nov. 13, 1984

[54] SUPERCRITICAL EXTRACTION PROCESS

[75] Inventors: Daniel M. Coombs; Gary P. Willers, both of Bartlesville, Okla.

[73] Assignee: Phillips Petroleum Company, Bartlesville, Okla.

[21] Appl. No.: 408,964

[22] Filed: Aug. 17, 1982

[51] Int. Cl.$^3$ .................. C10C 3/08; C10C 1/18; C10G 21/00
[52] U.S. Cl. .................. 208/309; 208/312; 208/45; 208/251 R
[58] Field of Search ............ 208/309, 251 R, 45, 208/312; 196/14.52

[56] References Cited

U.S. PATENT DOCUMENTS

| | | | |
|---|---|---|---|
| 2,166,160 | 7/1939 | King | 196/13 |
| 2,391,576 | 12/1945 | Katz et al. | 196/73 |
| 2,721,790 | 10/1955 | Olney | 196/14.52 |
| 2,853,426 | 9/1958 | Peet | 208/251 R |
| 2,895,902 | 7/1959 | Peet | 208/309 |
| 2,940,920 | 6/1960 | Garwin | 208/45 |
| 2,950,244 | 8/1960 | Lawson, Jr. | 208/309 |
| 3,074,882 | 1/1963 | Gross et al. | 208/309 |
| 3,202,605 | 8/1965 | Redcay | 208/337 |
| 3,507,777 | 4/1970 | Hemminger | 208/309 |
| 3,627,675 | 12/1971 | Ditman et al. | 208/309 |
| 3,658,484 | 4/1972 | Bright | 196/14.52 |
| 3,658,695 | 4/1982 | VanPool | 208/251 |
| 3,798,157 | 3/1974 | Manzanella et al. | 208/251 R |
| 3,843,328 | 10/1974 | Bosanac | 196/14.52 |
| 3,969,196 | 7/1976 | Zosel | 203/49 |
| 3,998,726 | 12/1976 | Bunas et al. | 208/309 |
| 4,088,540 | 5/1978 | Bunas | 208/309 |
| 4,125,459 | 11/1978 | Garwin | 208/309 |
| 4,201,660 | 5/1980 | Zosel | 208/251 R |
| 4,239,616 | 12/1980 | Gearhart | 208/309 |
| 4,278,529 | 7/1981 | Gearhart | 208/309 |
| 4,290,880 | 9/1981 | Leonard | 208/309 |
| 4,305,814 | 12/1981 | Leonard | 208/309 |

FOREIGN PATENT DOCUMENTS 880074 3/1980 Belgium .

OTHER PUBLICATIONS

Hydrocarbon Processing, vol. 59, No. 5, Sep. 1980, pp. 150-151, "Residuum Oil Supercritical Extraction", Kerr-McGee.

Primary Examiner—Delbert E. Gantz
Assistant Examiner—Helane E. Maull
Attorney, Agent, or Firm—L. M. Lavin

[57] ABSTRACT

The recovery of hydrocarbon values from high metals content feeds can be carried out more efficiently via supercritical extraction with recycle of a portion of the asphalt product and proper control of the use of countercurrent solvent flow to said extraction.

20 Claims, 5 Drawing Figures

SUPERCRITICAL EXTRACTION PROCESS

BACKGROUND

The supply of conventional crude oils is steadily diminishing. Heavy crudes are in greater supply but they contain higher boiling components and high sulfur contents which make them of lower value. The catalytic processing of these heavy crudes would maximize the yields of low-sulfur lower-boiling, high-value products. However, these heavy oils contain high contents of contaminant metals, such as nickel, vanadium, and iron, and coke-forming carbon materials that make catalytic processing very costly due to increased gas. increased coke and decreased gasoline production.

INVENTION

This invention presents a method for using supercritical solvent extraction to obtain high yields of extract oils that can be economically processed catalytically in present day refineries.

In one aspect, a process for demetallizing and deasphalting heavy crudes and residual oils via solvent extraction is improved by the use of a plurality of supercritical stages, preferably two or three, the last stage being still above solvent critical conditions, said solvent being a light hydrocarbon containing about 3 to 8 carbon atoms or mixtures thereof and said sequential stages remove asphalts and extract products for the two stage method, or asphalts, resins, and oils, respectively, for the three-stage method with recycle of the solvent overhead in a products purification step.

Another aspect of the invention involves a process for effecting increased yields of high quality extract oils in which a two-stage supercritical extraction of asphalt product and extract product are produced. Improvement is achieved via recycle of all or part of the asphalt or extract product fractions to the first stage to attain increased yield or, alternatively, at the same extract oil yield, reduce metals significantly in the extract product by said recycle of product to the first stage.

Another aspect of the invention involves a process for effecting increased yields of high quality extract oils in which a three-stage supercritical extraction of asphalt product, resins and extract oils are produced. Improvement is achieved via recycle of all or part of the asphalt or extract product fractions to the first stage to attain increased yield or, alternatively, at same extract oil yield, reduce metals significantly in the extract oil by said recycle of asphalt product to the first stage.

OBJECTS OF THE INVENTION

It is an object of the invention to provide a process for the recovery of extract oils from high-metals content carbonaceous feeds, which process employs at least one supercritical solvent extraction step.

It is another object of the invention to provide a method for recovering oil products from contaminated hydrocarbon-based feeds, in which method two or more supercritical extractions and solvent stripping operations are used.

It is yet another object of the invention to provide a process in accordance with which a two-stage or three-stage supercritical extraction in which recycling of portions of the extraction products to the first stage is carried out.

ADVANTAGES

The process presented has several advantages over prior art, including the obtainment of high yields of extract oil with acceptable metals and carbon residue contents, improved operability of handling the rejected asphalt bottoms material by use of higher extraction temperatures and energy-efficiency due to supercritical solvent recovery.

Other aspects and advantages of the invention will become apparent from a study of applicants' specification and figures.

A preferred embodiment of this invention shows recycle of at least a portion of the asphalt or extract products to the first extraction vessel.

Figure 2:
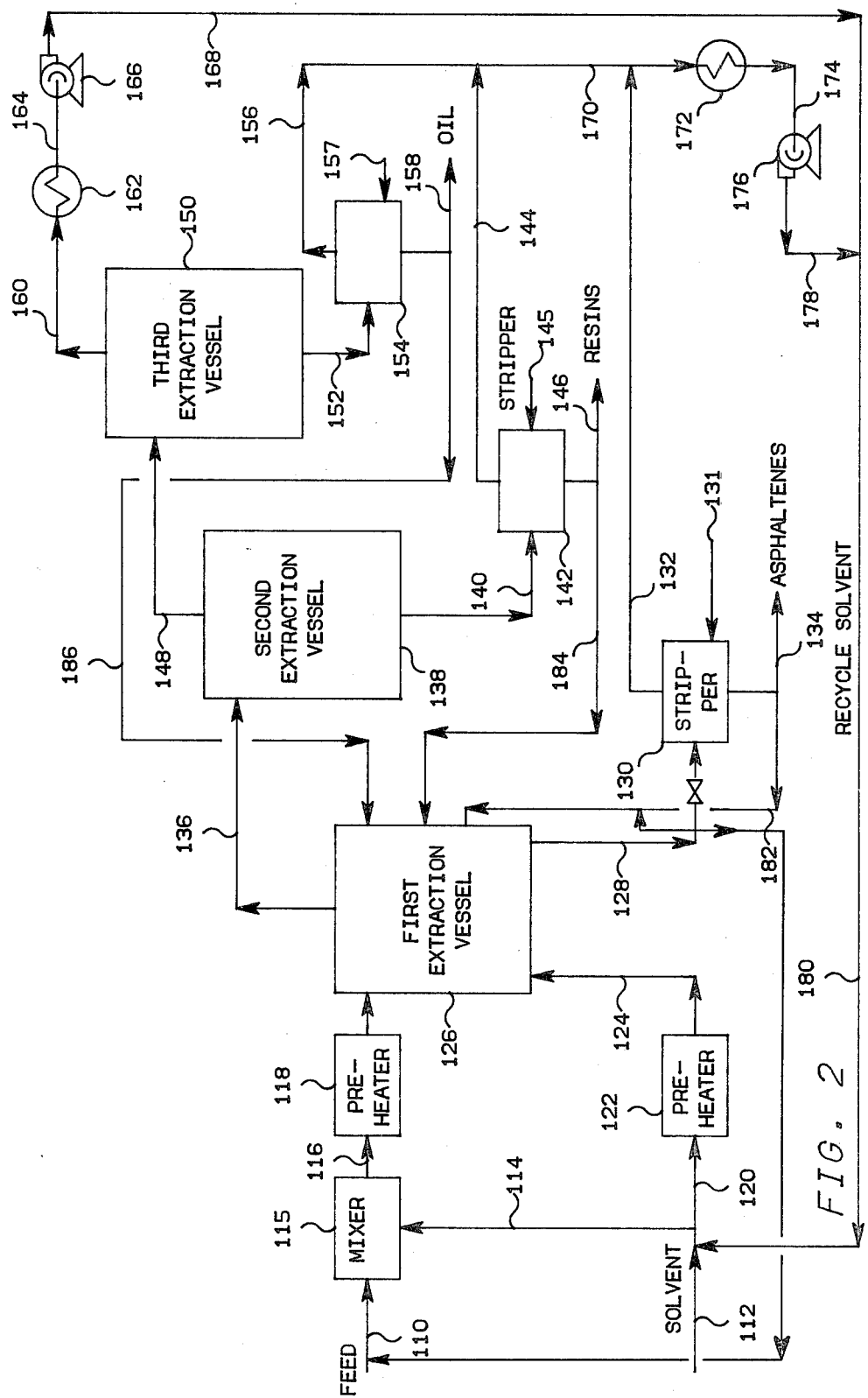

FIG. 2 is a diagrammatic illustration of a three stage supercritical extraction process showing the preferred embodiment of asphaltene recycle or recycle of at least a portion of the resins from the second extraction stage to the mid-position of the first extraction stage or recycle of at least a portion of the oils from the third extraction step to the upper portion of the first extraction vessel.

Figure 3:
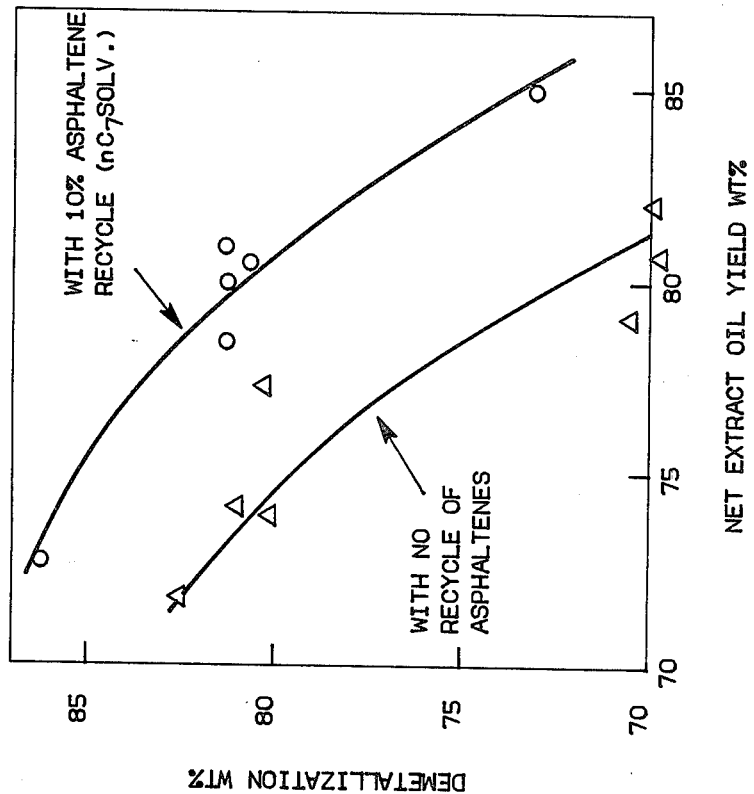

FIG. 3 shows the results of the preferred embodiment of recycling 10% of the asphaltene product to the first extraction vessel. Increased demetallization occured at the same net extract oil yield and conversely increased net oil yield occured at the same demetallization or a combination of increased yield and demetallization occurred.

Figure 4:
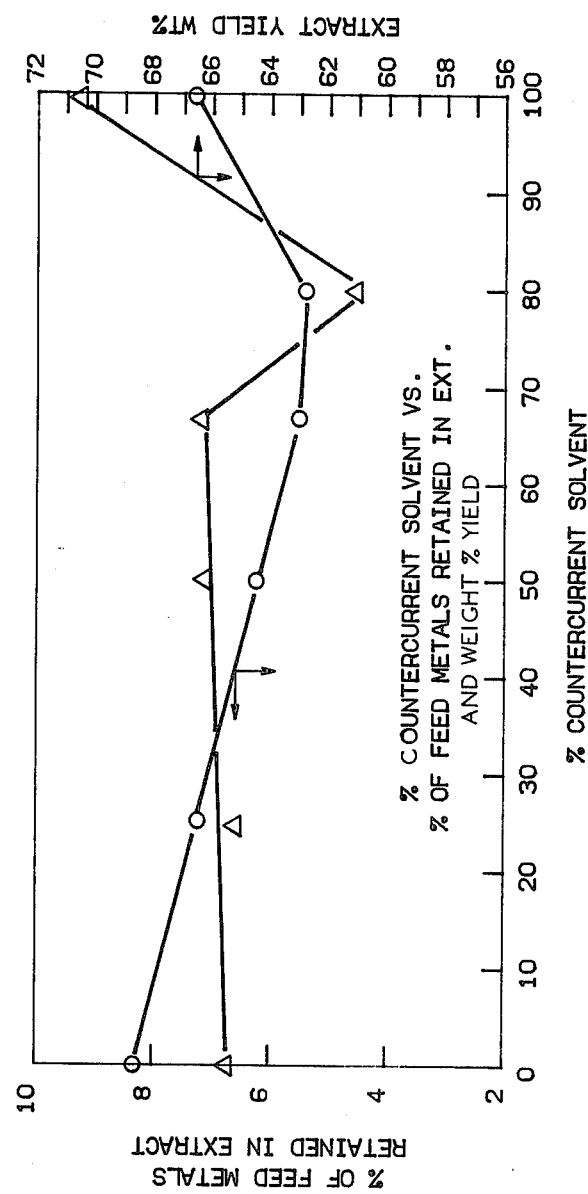

FIG. 4 shows the results of the preferred embodiment of feeding at least 66% of the solvent in a countercurrent fashion. This embodiment allowed for extracts that contain less contaminants to be obtained at the same yield.

Figure 5:
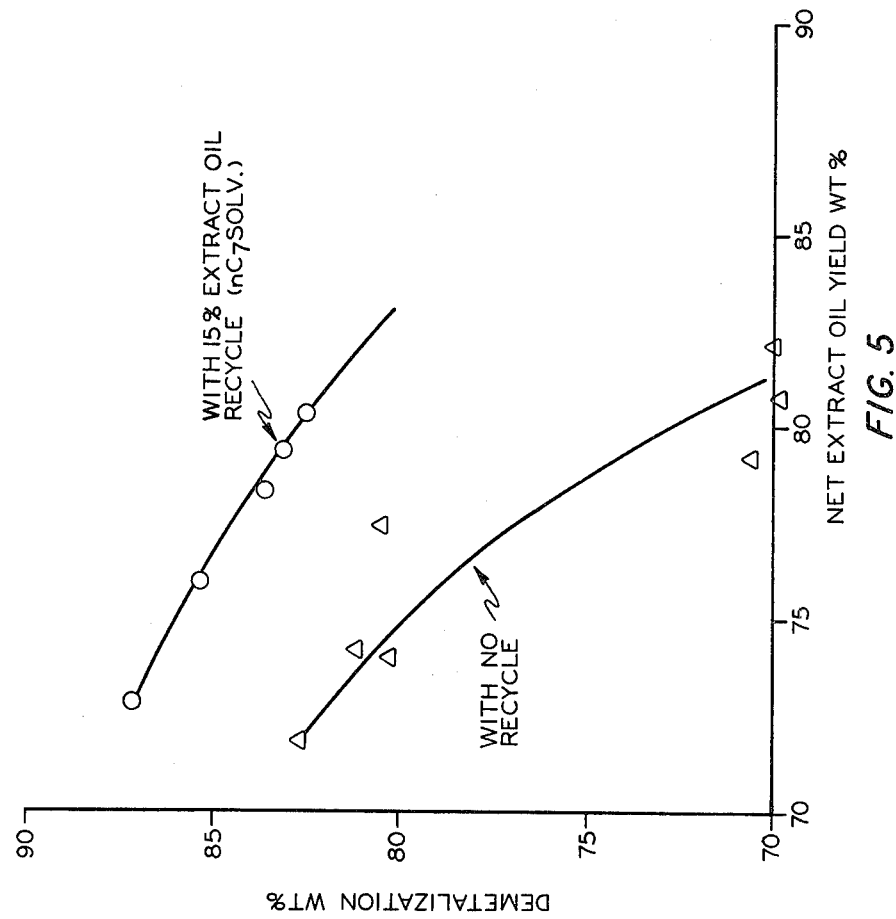

FIG. 5 depicts the results of the preferred embodiment of recycling 15 weight percent of the extract product to the first extraction vessel. Increased demetallization occured at the same net extract oil yield; and, conversely, increased net oil yield occurred at the same demetallization.

DESCRIPTION OF THE INVENTION

Carbonaceous Feeds

The carbonaceous feeds to be processed in accordance with the invention are organic materials containing large amounts of metals and other contaminants. Generally characterized as high-metals content feeds, they are hydrocarbon-based materials whose solvent extracts can be upgraded to yield useful hydrocarbon products, such as fuels and lubricants.

Typical carbonaceous feeds to be employed herein include resids and crudes from various geographical regions. Preferred feeds are heavy oils and resids bearing such designations as: Monagas, Maya, Canadian heavy oil and the like. Kansas City vacuum resid, Kansas City Topped cracking crude and the like are also operable. Mixtures of feeds can be used.

While the metals content of the initial carbonaceous material can vary within wide limits, the inventive processes are highly effective on those having metals contents of 100 ppm or higher. Those with metals contents of 200 ppm to 1500 ppm are preferred.

Solvents

The critical temperature of a material is the temperature above which it cannot be liquified or condensed via pressure changes. A material's critical pressure is the pressure under which it may exist as a gas in equilibrium with the liquid at its critical temperature. The solvents employed in the instant invention are those whose critical parameters render them suitable for conventional supercritical extraction operations.

Generally, solvents useful in the separation/extraction steps of the invention are hydrocarbons containing from about 2 to about 10 carbon atoms. Typical solvents for supercritical extractions include $C_3$ to $C_8$ cyclic or acyclic hydrocarbons and the like and mixtures thereof. Preferred solvents include $C_5$ to $C_7$ paraffins and mixtures thereof. Highly preferred solvents are n-pentane, branched pentanes, n-hexane, branched hexanes, n-heptane and branched heptanes.

Various considerations such as economics and apparatus limitations will have bearing on the parameters under which extraction takes place.

Furthermore, routine experimentation by the skilled artisan will yield optimum parameters for a given situation. With this in mind, the following tabulations should be read as merely suggestive, and not limiting, in carrying out processes based on the instant invention.

The following extraction variables are suggested:

|  | Range | Preferred Range |
| --- | --- | --- |
| Extraction Temperature °F. | 200–900 | 400–650 |
| Extraction pressure, psig. | 200–2000 | 500–1000 |
| Extraction Residence Time, min. | 0.5–60 | 1–20 |
| Extract/Residue Split (by weight) | 1–12 | 2–9 |

Conventional processing techniques, such as desulfurization, hydrotreating, and fluid catalytic cracking can be employed in combination with the separation and recovery techniques employed herein.

Other aspects of the invention will be understood by reference to the accompanying figures, which are described below.

DESCRIPTION OF THE DRAWINGS

Figure 1:
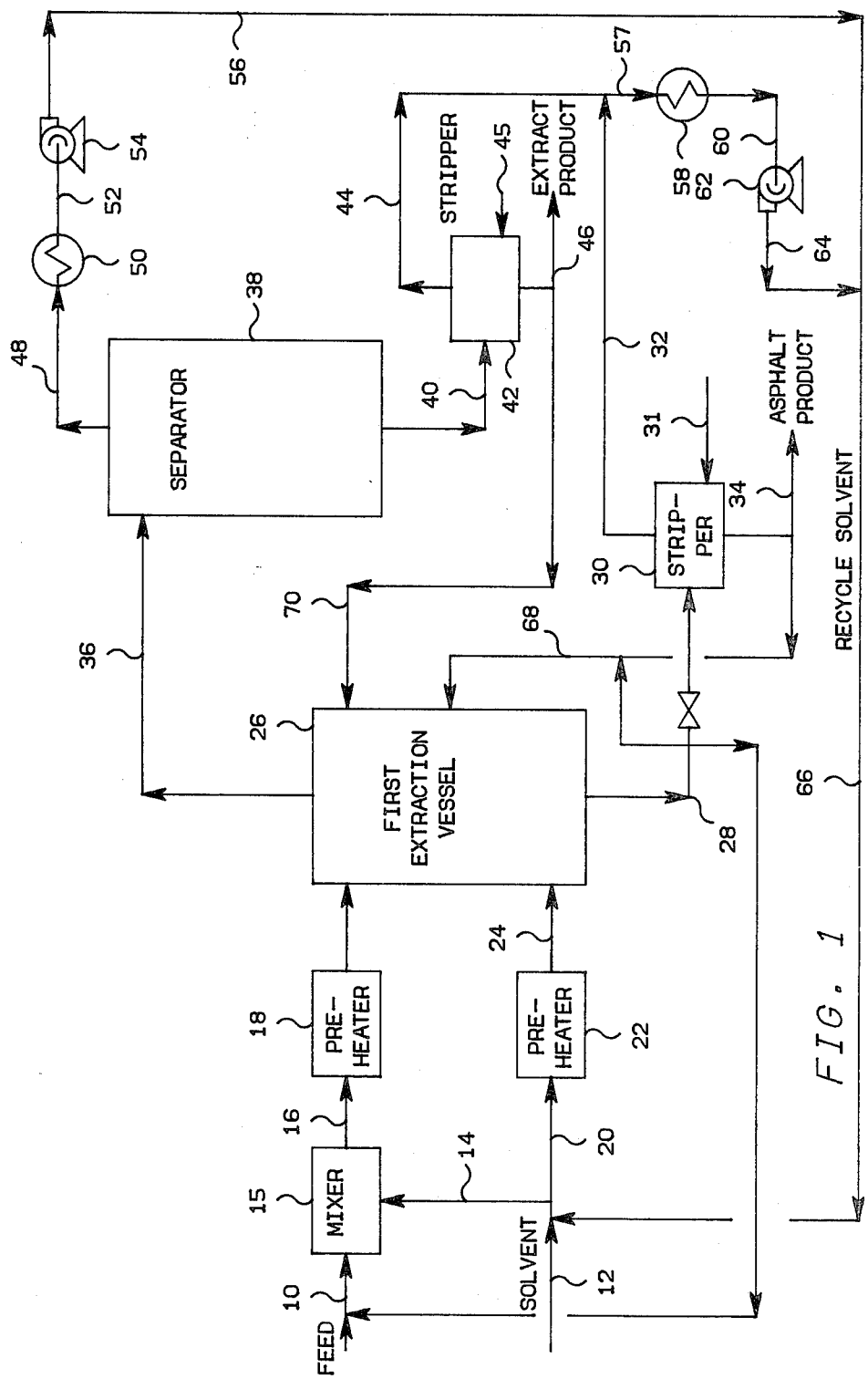
FIG. 1 is a diagrammatic illustration of the process of this invention.

FIG. 1 illustrates one embodiment of the present invention. A feedstock comprising a heavy hydrocarbon material is introduced through conduit 10 to admix in mixer 15 with a portion of a solvent introduced to the mixer through conduit 14 after being initially introduced through conduit 12. The admixed solvent-feed oil passes through conduit 16 to a preheater 18. The remainder of the solvent is fed through conduit 20 to preheater 22. This solvent is then introduced via conduit 24 to the extraction vessel 26 as countercurrent solvent. In a preferred embodiment of this invention from about 55 to about 75% of the solvent is fed into the extraction vessel in a countercurrent manner. The overall (admixed plus countercurrent) solvent to oil ratio, by volume, can range from 2:1 to 10:1, preferably from 3:1 to 8:1. Larger quantities of solvent can be used but such use is not necessary.

The first extraction vessel 26 is maintained at an elevated temperature and pressure to effect a separation of the mixture into a fluid-like first light phase comprising solvent and extract product and containing primarily oils and resins. Also, a fluid-like first heavy phase comprising the asphalt product, most of the organometallics and coke-forming carbon compounds and some solvent is present.

The first extraction vessel 26 is comprised of a multistaged extractor with feed oil-solvent mixture being fed as a fluid like heavy phase to the upper middle stages of the extractor while solvent is fed to the lower portion of the extractor as a fluid-like light phase. The preferable extractor internals are comprised of alternate segmental baffle trays although other internals such as packing, perforated trays or the like or no internals such as an open column can be used satisfactorily for the desired separation of asphalt from resins and oils by dense (supercritical) gas phase solvent extraction.

The fluid-like heavy phase is withdrawn from vessel 26 through conduit 28 to stripper 30 to strip any solvent that may be contained in the first heavy phase. Preferably the stripper 30 would comprise a steam or inert gas stripper. Steam or inert gas such as nitrogen enters the stripper via conduit 31. The recovered solvent then can be recycled in the process through conduit 32 and the product heavy phase containing asphaltenes and organometallic compounds can be withdrawn in conduit 34.

The fluid-like first light phase is sent via conduit 36 to a separator vessel 38. The separator vessel 38 is maintained at an elevated temperature above the critical temperature of the solvent and and elevated pressure to effect a separation of the mixture into a fluid-like second light phase comprising solvent and some amount of oils and a fluid-like second heavy phase comprising extract product, organometallic compounds and some solvent. The fluid-like second heavy phase is withdrawn from vessel 38 through conduit 40 to stripper 42 to strip any solvent that may be contained in the second heavy phase.

Separator vessel 38 can be an open vessel or contain some internals. A modest reduction in pressure of 25 to 200 psi from that of the first extraction vessel 26 accompanied by a modest addition of heat allows precipitation of a second fluid-like phase containing extract product and some solvent within separator vessel 38. Preferably the stripper 42 will comprise a steam or inert gas stripper. Steam or inert gas enters the stripper 42 via conduit 45. The recovered solvent then can be recycled in the process through conduit 44 and the product heavy phase comprising the extract product that contains a reduced amount of organomettalic compounds can be withdrawn in conduit 46.

The fluid-like second light phase which is essentially pure solvent is sent via conduit 48 to heat exchanger 50 then via conduit 52 to a pump 54 for recycle in the process via conduit 56. The heat exchanger 50 should preferably exchange heat with the process to increase the solvent density to a point where pump 54 operates efficiently. This usually occurs when the solvent temperature is within about ±50° F. of the critical temperature. Recycle solvent from conduits 32 and 44 is sent via conduit 57 to a condenser 58 and then through conduit 60 to pump 62 then via conduit 64 where, joined with recycle solvent in conduit 66 is returned to make up solvent in conduit 12.

In an embodiment asphalt product from the heavy phase from extraction vessel 26 or stripper 30 is recycled via conduit 68 or to the feed line 10 or directly to the first extraction vessel 26. Such recycle allows the process to either increase yield of extract oil in first light phase in conduit 36 or decrease organometallic content of said oil at the same yield. A further embodiment comprises recycling at least a portion of extract product via conduit 70 to vessel 26.

FIG. 2 illustrates a further embodiment of the present invention. A feedstock comprising a heavy hydrocarbon material is fed through conduit 110 to a mixer 115 to admix with a part of the total solvent from conduit 112 entering mixer 115 via conduit 114. The mixed feed oil and solvent pass through conduit 116 to preheater 118.

The remainder of solvent is fed through conduit 120 to preheater 122. This solvent is then introduced via conduit 124 to the extraction vessel 126 as countercurrent solvent. In a preferred embodiment of this invention 55 to 75% of the solvent should be fed in a countercurrent manner. The overall (admixed plus countercurrent) solvent to oil ratio by volume could range from 2:1 to 10:1 and would preferably range from 3:1 to 8:1. It is understood that larger quantities of solvent can be used but such use is not necessary.

This first extraction vessel 126 is a multistaged extractor as described in FIG. 1 with the preferable internals being segmental baffle trays although other types of internals can operate satisfactorily.

The fluid-like first light phase is sent via conduit 136 to a second extraction vessel 138. The second extraction vessel 138 is kept at an elevated temperature above the critical temperature of the solvent and an elevated pressure to effect a separation of the mixture into a fluid-like second light phase comprising solvent and oils and a fluid-like second heavy phase comprising heavy extract, organometallic compounds and some solvent.

The configuration of the internals of the second extraction vessel 138 is preferably an open vessel or one with internals wherein a modest reduction in pressure of 25 to 100 psi coupled with modest addition of heat from that of the first extraction vessel 126 allows precipitation of a second fluid-like phase containing heavy extract or resinous materials, solvent and some organometallic compounds.

The fluid like second heavy phase is withdrawn from vessel 138 through conduit 140 to stripper 142 to strip any solvent that may be contained in the second heavy phase. Preferably the stripper 142 would use a steam or inert gas stripping agent introduced via conduit 145. The product heavy phase containing the heavy extract and some organometallic compounds can be withdrawn via conduit 146.

The fluid-like second light phase is sent via conduit 148 to a third extraction vessel 150. The third extraction vessel 150 is maintained at a temperature above the critical temperature of the solvent and an elevated pressure to effect a separation of the mixture into a fluid-like third light phase comprising solvent and a fluid-like third heavy phase comprising the light extract oil, small amounts of organometallic compounds and some solvent. The fluid-like third heavy phase is withdrawn from vessel 150 through conduit 152 to stripper 154 to strip any solvent that may be contained in the third heavy phase. Steam or inert gas enters stripper 154 through conduit 157.

The internal configuration of the third extraction vessel can be open or have internals wherein there is a modest reduction in pressure such as 15 to 100 psi and increase in heat from that of the second extraction vessel 138. The recovered solvent then can be recycled in the process through conduit 156 and the product heavy phase containing oil can be withdrawn in conduit 158.

The fluid-like third light phase which is essentially solvent is sent via conduit 160 to heat exchanger 162 then via conduit 164 to a pump 166 for recycle in the process via conduit 168. Heat exchanger 162 should preferably exchange heat with the process to increase the solvent density to a point where pump 176 will operate efficiently. This usually occurs when the solvent temperature is within about ±50° F. of the critical temperature. Recycle solvent from conduits 132, 144 and 156 is sent via conduit 170 to condenser 172 and then through conduit 174 to pump 176 then via conduit 178 where joined with recycle solvent in conduit 168 is returned to join with solvent in conduit 180 which is recycled to mix with make up solvent in conduit 112.

In an embodiment at least a portion of asphaltene product from the heavy phase from extraction vessel 126 or stripper 130 is recycled via conduit 128 to feedline 110 or first extraction vessel 126. Likewise at least a portion of asphalt product from stripper 130 is recycled via conduit 182 to the first extraction vessel. Likewise at least a portion of heavy extract from stripper 142 is recycled via conduit 184 to the first extraction vessel. Likewise at least a portion of light extract from stripper 154 is recycled via conduit 186 to the upper portion of first extraction vessel.

Such recycles in conduits 182, 184 and 186 serve to either increase yield of extract oil in the first light phase in conduit 136 at the same demetallization or decrease the organometallic content of said extract oil at the same yield.

To further illustrate the process of this invention and not by way of limitation the following examples are provided.

EXAMPLES

This set of experimental runs represents the results obtained by the embodiment of FIG. 1 wherein 10 weight percent asphalt stripped from the first heavy phase was blended with 90 weight percent fresh feed. The fresh feed was a topped Monagas residuum cut boiling at 650° F. and above. This blended feed of asphalt and Monagas 650° F. plus residuum was admixed with 5.0 to 6.0 parts by weight of n-heptane solvent heated in separate runs in the range of 585° F.–605° F. all at 650 psig in a bench scale supercritical extraction unit operating semi-continuously. This bench extraction column represented the first extraction vessel of FIG. 1. The feed mixture separated into a light and a heavy phase. The light phase was withdrawn, condensed and stripped to remove solvent. Six similar runs were made to give the results of Table I.

TABLE I

| | | | | | | Extract Properties | | | | | |
|---|---|---|---|---|---|---|---|---|---|---|---|
| Run # | T, °F. | P, psig | Solvent/Gross Ext. Feed Oil | Yield, Wt % | Net Ext. Yield Wt % | Ni, wppm | V, wppm | API @ 60° F. | S, Wt % | Rams., Wt % | % demetal-lization |
| 78 | 590 | 650 | 5.9 | 73.2 | 81.3 | 31 | 118 | 12.4 | 3.2 | 6.7 | 79.8 |
| 79 | 585 | 650 | 6.0 | 76.1 | 84.6 | 40 | 151 | 12.6 | 3.2 | 8.1 | 73.1 |

TABLE I-continued

| | | | Asphalt Bottoms Recycle Data Using Monagas 650° F.+ Resid and N—Heptane Solvent | | | | Extract Properties | | | | |
|---|---|---|---|---|---|---|---|---|---|---|---|
| Run # | T, °F. | P, psig | Solvent/Gross Ext. Feed Oil | Yield, Wt % | Net Ext. Yield Wt % | Ni, wppm | V, wppm | API @ 60° F. | S, Wt % | Rams., Wt % | % demetallization |
| 80 | 595 | 650 | 6.0 | 72.6 | 80.7 | 31 | 107 | 12.6 | 3.2 | 7.0 | 81.4 |
| 81 | 605 | 650 | 6.2 | 65.3 | 72.6 | 26 | 88 | 14.2 | 3.1 | 5.0 | 86.2 |
| 82 | 594 | 650 | 5.0 | 72.4 | 80.4 | 32 | 111 | 13.1 | 3.2 | 6.4 | 80.8 |
| 83 | 595 | 650 | 5.2 | 70.5 | 78.3 | 32 | 111 | 12.4 | 3.2 | 7.0 | 81.3 |
| Asphalt + Feed Blend | | | | | | 152 | 584 | 6.3 | 3.7 | 17.6 | |
| Monagas 650° F.+ Resid (Fresh Feed) | | | | | | 110 | 490 | 7.9 | 3.6 | 14.9 | |

These data show net extract yield of 72.6 to 84.6 wt % and 73.1 to 86.2 wt % demetallization. Wt % demetallization is defined as follows:

$$\% \text{ demetallization} = \frac{(\text{Ni} + \text{V in Fresh Feed}) - \text{Extract Ni} + \text{V} \times \text{Net extract yield})}{\text{Ni} + \text{V in Fresh Feed}} \times 100$$

An example calculation for run 78 is:

$$\% \text{ demetallization} = \frac{(110 + 490) - [(31 + 118) \times .813]}{110 + 490} \cdot 100 = 79.8\%$$

The data of Table I containing the results of asphaltenes recycle is compared with no asphaltenes recycle in Table II.

TABLE II

| | | | Without Asphalt Bottoms Recycle Data Using Monagas 650° F.+ Resid and N—Heptane Solvent | | | | Extract Properties | | | |
|---|---|---|---|---|---|---|---|---|---|---|
| Run # | T, °F. | P, psig | Solvent/Net Ext. Feed Oil | Yield, Wt % | Ni, wppm | V, wppm | API @ 60 | S, Wt % | Rams., Wt % | % demetallization |
| 41 | 611 | 725 | 9.1 | 73.7 | 27 | 135 | 11.9 | 3.3 | 6.7 | 80.2 |
| 37 | 597 | 725 | 6.0 | 83 | 65 | 244 | 11.0 | 3.3 | 10.2 | 57.3 |
| 38 | 610 | 725 | 6.2 | 81.9 | 43 | 177 | 12.2 | 3.1 | 7.8 | 69.9 |
| 40 | 610 | 725 | 4.1 | 74.0 | 28 | 126 | 11.8 | 3.3 | 6.8 | 81.1 |
| 35A | 572 | 800 | 4.0 | 71.7 | 16 | 128 | 12.1 | 3.0 | 6.5 | 82.8 |
| 38A | 560 | 875 | 4.0 | 80.4 | 30 | 198 | 10.4 | 3.0 | 9.7 | 69.4 |
| 26A | 572 | 875 | 4.0 | 77.1 | 17 | 136 | 13.0 | 3.0 | 6.7 | 80.4 |
| 39A | 550 | 875 | 3.9 | 81.3 | 32 | 205 | 10.2 | 3.1 | 9.8 | 67.9 |
| 40A | 550 | 875 | 4.4 | 78.9 | 30 | 194 | 10.4 | 3.1 | 9.3 | 70.6 |

This data is further illustrated in FIG. 3 where the data from Table I and Table II are graphically represented by plotting wt. % net extract oil yield versus wt. % demetallization. In addition a plot of wt. % net extract oil yield versus wt. % demetallization for unblended Monagas 650° F.+ topped residuum is given.

This FIG. 3 showed the improvement in demetallization at the same yet yield or alternatively the increase in yield at the same demetallization. When recycling 10% of the product asphalt the yield is about 5–8% greater at the same demetallization for asphalt recycle over no recycle or was about 5–8% increase in demetallization for the same yield. This improvement significantly impacted the usefulness of this process by providing greater yields of higher value products.

Table III, like FIG. 4, shows the effect of employing countercurrent solvent addition in the extraction of Kansas City Topped Cracking Crude. The solvent used for this study was n-pentane.

TABLE III

| | | | Countercurrent Solvent Effect | | | | | | | |
|---|---|---|---|---|---|---|---|---|---|---|
| Percentage Countercurrent solvent percent | T, °F. | P, psig | Solvent Extract Feed Oil | Yield, Wt. % | Ni, ppm | V, ppm | API @ 60 | S, Wt % | Rams., Wt % | % Demetallization | % Feed metals retained in extract |
| 0 | 435 | 675 | 6.2 | 65.5 | 2.5 | 10.2 | 18.8 | 1.95 | 2.8 | 91.7 | 8.3 |
| 25 | 435 | 675 | 6.4 | 65.3 | 2.6 | 8.4 | 19.1 | 1.96 | 3.0 | 92.8 | 7.2 |
| 50 | 435 | 675 | 6.4 | 66.2 | 1.7 | 7.6 | 19.3 | 1.94 | 2.3 | 93.8 | 6.2 |
| 67 | 435 | 675 | 6.4 | 66.1 | 1.6 | 7.2 | 19.3 | 2.08 | 2.0 | 94.5 | 5.5 |
| 80 | 435 | 675 | 7.0 | 61.1 | 1.3 | 7.0 | 19.3 | 2.01 | 1.8 | 94.9 | 5.1 |
| 100 | 435 | 675 | 6.5 | 70.8 | 1.9 | 8.4 | 19.4 | 2.02 | 2.8 | 92.7 | 7.3 |

To illustrate recycle of extract product with fresh 650° F.+ Monagas feed to the first extractor, a series of runs were conducted. The extract was produced at an 82 wt. % yield of 650° F.+ Monagas and 15 parts of this extract were blended with 85 parts of 650° F.+ fresh Monagas feed. This feed blend was then fed to the semi-continuous supercritical extraction column. Table IV contains the data of the extract feed-blend study. The recycle of extract product benefited the extraction selectivity by approximately the same amount as the asphalt product recycle. Better selectivity is defined as consistently better demetallization results over a range of extract product yields. Extract product recycle was easier control than the recycle of the more viscous asphalt product.

An assumption was necessary to calculate the net yield of the fresh feed from these experiments. The total yield of extract product would be the yield obtained from the fresh feed or the "net yield" and the yield obtained from the recycled extract product. The total yield was the measured quantity. We assumed that the yield from the extract was directly proportional to the net yield obtained from the fresh feed. For example, at 82 wt. % net yield, the yield of recycle extract would be 100%, or, at a 79 wt. % net yield, the yield from the recycle extract would be (79/82)×100% or 96.3%. This assumption and the feed blend proportions were used to derive the following equation (1) for total extract yield. This equation was then rearranged to solve for net extract yield (2) from the fresh feed so that recycle data could be compared to base case data.

Total Yield = Net Yield×0.85+(Net Yield/0.82)×0.15        Eqn (1)

Net Yield = Total Yield/1.033        Eqn (2)

TABLE IV

Effect of Light Extract Oil Recycle

| Run # | T, °F. | P, psig | Solvent/ Feed Oil | Total Ext. Yield, Wt % | Net Ext. Yield, Wt % | Ni, ppm | V, ppm | API @ 60° F. | S, Wt % | Rams., Wt % | % demetallization |
|---|---|---|---|---|---|---|---|---|---|---|---|
| 73 | 590 | 650 | 6.2 | 78.3 | 75.8 | 31.6 | 87.0 | 12.0 | 3.41 | 6.74 | 85.1 |
| 72 | 590 | 600 | 5.5 | 75.1 | 72.7 | 28.5 | 80.5 | 12.7 | 3.36 | 5.80 | 86.9 |
| 74 | 600 | 700 | 6.0 | 80.8 | 78.2 | 33.8 | 94.8 | 11.9 | 3.18 | 7.40 | 83.4 |
| 75 | 600 | 700 | 4.9 | 81.7 | 79.1 | 34.8 | 95.1 | 11.7 | 3.24 | 7.69 | 83.0 |
| 76 | 595 | 700 | 4.8 | 82.7 | 80.1 | 35.3 | 97.5 | 12.4 | 3.30 | 7.33 | 82.4 |
| Recycle Extract Material | | | | | 82 | 34.7 | 151 | 12.1 | 3.3 | 8.72 | |
| 650° F.+ Monagas Feed | | | | | 100 | 120 | 485 | 7.3 | 3.6 | 14.8 | |

The data is further illustrated in FIG. 5 where the data from Table IV is graphically represented by plotting wt. % net extract oil yield versus wt. % demetallization. In addition a plot of wt. % net extract oil yield versus wt. % demetallization for unblended Monagas 650° F.+ topped residuum is given.

This FIG. 5 showed similar results as in FIG. 3. That is, when recycles 15 wt. % extract oil the yield is about 5-10% greater as the same demetallization for extract oil recycle over no recycle or was about 5-10% increase in demetallization for the same yield.

Reasonable variations, such as those which would occur to a skilled artisan, may be made herein without departing from the scope of the invention.

We claim:

1. A process for the recovery of extract oils from a high metals content carbonaceous feed which comrpises the steps of:
   (1) contacting said feed with a solvent in a first separation zone comprising an extraction vessel under supercritical conditions for said solvent in which zone the separation of said feed into a light phase and a heavy phase is effected;
   (2) passing said heavy phase from step (1) to a first stripper where said stripper's light phase, containing solvent, is recovered for reuse and said stripper's heavy phase, containing asphalt product, is divided into two portions, with one portion being recycled to said first separation zone and the other portion being recovered as asphalt product; and
   (3) passing said light phase from step (1) to a second separation zone wherein a second light phase, containing solvent, is produced and is recycled to said first separation zone, and a heavy phase, produced from said second separation zone, is passed to a second stripper for recovery of said second stripper's extract product containing heavy phase and said second stripper's solvent containing light phase, which is reused.

2. The process of claim 1 wherein said second separation zone comprises and extraction vessel under supercritical conditions for said solvent in which separation into a light phase, containing solvent, and a resin-containing heavy phase takes place.

3. The process of claim 2 wherein said light phase from said second separation zone is passed to a third separation zone in which a solvent-containing light phase and an oil-containing heavy phase are produced.

4. The process of claim 3 wherein the third separation zone comprises an extraction vessel in which a supercritical solvent extraction takes place and from which the light phase is recycled to the first separation zone and the heavy phase is passed to a stripper for recovery of product oil.

5. The process of any one of claims 1-4 wherein at least one of the extraction vessels employed has extractor internals comprised of alternate segmental baffle trays.

6. The process of claim 5 wherein about 55 to about 75% of the solvent employed for extraction is fed into the extractor in a countercurrent manner.

7. The process of any one of claims 1-4 wherein about 55 to about 75% of the solvent employed for extraction is fed into the extractor in a countercurrent manner.

8. The process of claim 7 wherein the ratio of solvent to oil during the extraction is between about 2:1 and about 10:1 by volume.

9. The process of any one of claims 1-4 wherein at least a portion of extract product is recycled to the first separation zone.

10. A process for the recovery of extract oils from a high metals content carbonaceous feed which comprises the steps of:
    (1) contacting said feed with a solvent in a first separation zone comprising an extraction vessel under supercritical conditions for said solvent in which zone the separation of said feed into a light phase and a heavy phase is effected;
    (2) passing a portion of said heavy phase from step (1) to be recycled to said first separation zone via the feed oil conduit or directly to said first separation zone; and
    (3) passing said light phase from step (1) to a second separation zone wherein a second light phase, containing solvent, is produced and is recycled to said first separation zone, and a heavy phase, produced from said second separation zone, is passed to a second stripper for recovery of said second stripper's extract product containing heavy phase and said second stripper's solvent containing light phase, which is reused.

11. The process of claim 10 wherein said second separation zone comprises an extraction vessel under supercritical conditions for said solvent, in which separation into a light phase containing solvent and a resin-containing heavy phase takes place.

12. The process of claim 11 wherein said light phase from said second separation zone is passed to a third separation zone in which a solvent-containing light phase and an oil-containing heavy phase are produced.

13. The process of claim 12 wherein said third separation zone comprises an extraction vessel in which a supercritical solvent extraction takes place and from which said light phase is recycled to said first separation zone and said heavy phase is passed to a stripper for recovery of product oil.

14. The process of any one of claims 10–13 wherein at least one of the extraction vessels employed has extractor internals comprised of alternate segmental baffle trays.

15. The process of claim 14 wherein about 55 to about 75 percent of the solvent employed for extraction is fed into the extractor in a countercurrent manner.

16. The process of any of claims 10–13 wherein about 55 to about 75 percent of the solvent employed for extraction is fed into the extractor in a countercurrent manner.

17. The process of claim 16 wherein the ratio of solvent to oil during the extraction is between about 2:1 and about 10:1 by volume.

18. The process of any of claims 10–13 wherein at least a portion of extract product is recycled to the first separation zone.

19. The process according to claim 4 wherein a portion of said recovered product oil is recycled to said first separation zone.

20. The process according to claim 13 wherein a portion of said recovered product oil is recycled to said first separation zone.

* * * * *